US010527157B2

(12) United States Patent
Lee et al.

(10) Patent No.: US 10,527,157 B2
(45) Date of Patent: Jan. 7, 2020

(54) SHIFT LEVER AND VEHICLE CONTROL SYSTEM INCLUDING THE SAME

(71) Applicant: SAMSUNG DISPLAY CO., LTD., Yongin-si, Gyeonggi-do (KR)

(72) Inventors: Tae Hee Lee, Yongin-si (KR); Won Ki Hong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 214 days.

(21) Appl. No.: 15/693,690

(22) Filed: Sep. 1, 2017

(65) Prior Publication Data
US 2018/0180169 A1 Jun. 28, 2018

(30) Foreign Application Priority Data

Dec. 23, 2016 (KR) .................. 10-2016-0178035

(51) Int. Cl.
G06K 9/00 (2006.01)
F16H 59/02 (2006.01)
G06F 3/044 (2006.01)

(52) U.S. Cl.
CPC ..... F16H 59/0278 (2013.01); F16H 59/0217 (2013.01); G06F 3/044 (2013.01); G06K 9/0002 (2013.01); F16H 2059/0282 (2013.01); G06F 2203/04105 (2013.01); G06K 9/001 (2013.01); G06K 9/0008 (2013.01)

(58) Field of Classification Search
CPC .. F16H 59/0278; F16H 59/0217; G06F 3/044; G06F 2203/04105; G06K 9/0002; G06K 9/001; G06K 9/0008
See application file for complete search history.

(56) References Cited

U.S. PATENT DOCUMENTS

| 6,100,811 | A | * | 8/2000 | Hsu | B60H 1/00642 340/426.36 |
| 6,927,671 | B2 | * | 8/2005 | DeBono | B60R 25/066 180/287 |
| 7,347,298 | B2 | * | 3/2008 | Perry | B60R 25/06 180/289 |
| 8,564,424 | B2 | | 10/2013 | Evarts et al. | |
| 8,805,028 | B2 | * | 8/2014 | Miura | G06K 9/00013 382/115 |
| 9,933,068 | B2 | * | 4/2018 | Kim | F16H 59/0217 |
| 2004/0041689 | A1 | * | 3/2004 | DeBono | B60R 25/066 340/5.52 |
| 2008/0030301 | A1 | * | 2/2008 | Terao | B60R 25/04 340/5.53 |
| 2008/0069412 | A1 | * | 3/2008 | Champagne | G06K 9/00013 382/124 |
| 2016/0078268 | A1 | * | 3/2016 | Mankowski | G06F 21/32 382/124 |
| 2016/0216823 | A1 | * | 7/2016 | Setlak | G06F 3/0416 |

(Continued)

FOREIGN PATENT DOCUMENTS

| KR | 1020150004544 A | 1/2015 |
| KR | 101588972 B1 | 1/2016 |

Primary Examiner — John B Strege
(74) Attorney, Agent, or Firm — Cantor Colburn LLP

(57) ABSTRACT

A shift lever includes a lever knob, and a cover layer covering the lever knob, where the cover layer includes a touch sensor which generates touch information on a touch of a user, and the touch sensor includes a plurality of sensor pixels which senses a capacitance change corresponding to the touch.

19 Claims, 8 Drawing Sheets

(56) References Cited

U.S. PATENT DOCUMENTS

| | | | | |
|---|---|---|---|---|
| 2016/0350577 | A1* | 12/2016 | Yang | G06K 9/00053 |
| 2018/0032783 | A1* | 2/2018 | Wu | G06F 3/041 |
| 2018/0082099 | A1* | 3/2018 | Abe | G06K 9/0002 |
| 2018/0150163 | A1* | 5/2018 | Lee | G06F 3/0416 |
| 2018/0172145 | A1* | 6/2018 | Farges | F16H 61/22 |
| 2018/0196988 | A1* | 7/2018 | Tse | G06K 9/00087 |
| 2018/0239432 | A1* | 8/2018 | Hwang | G06F 3/04886 |

* cited by examiner

| 110 |

| 110 |
| 120 |

| 110 |
| 120 |
| 130 |
| 140 |

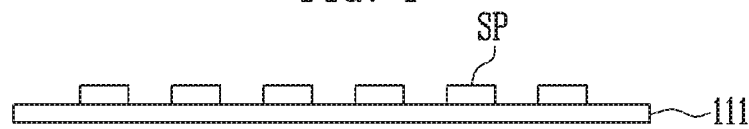
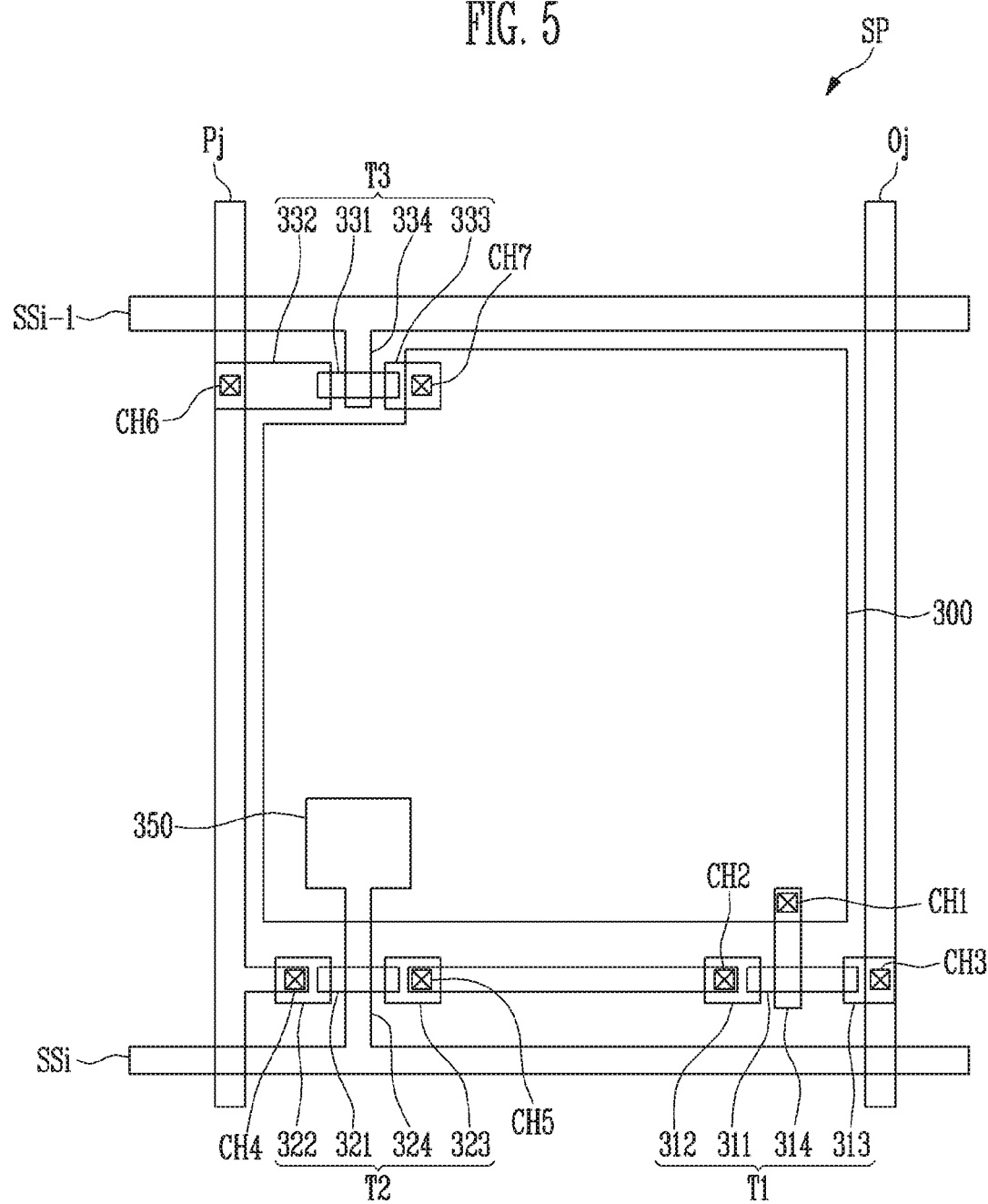

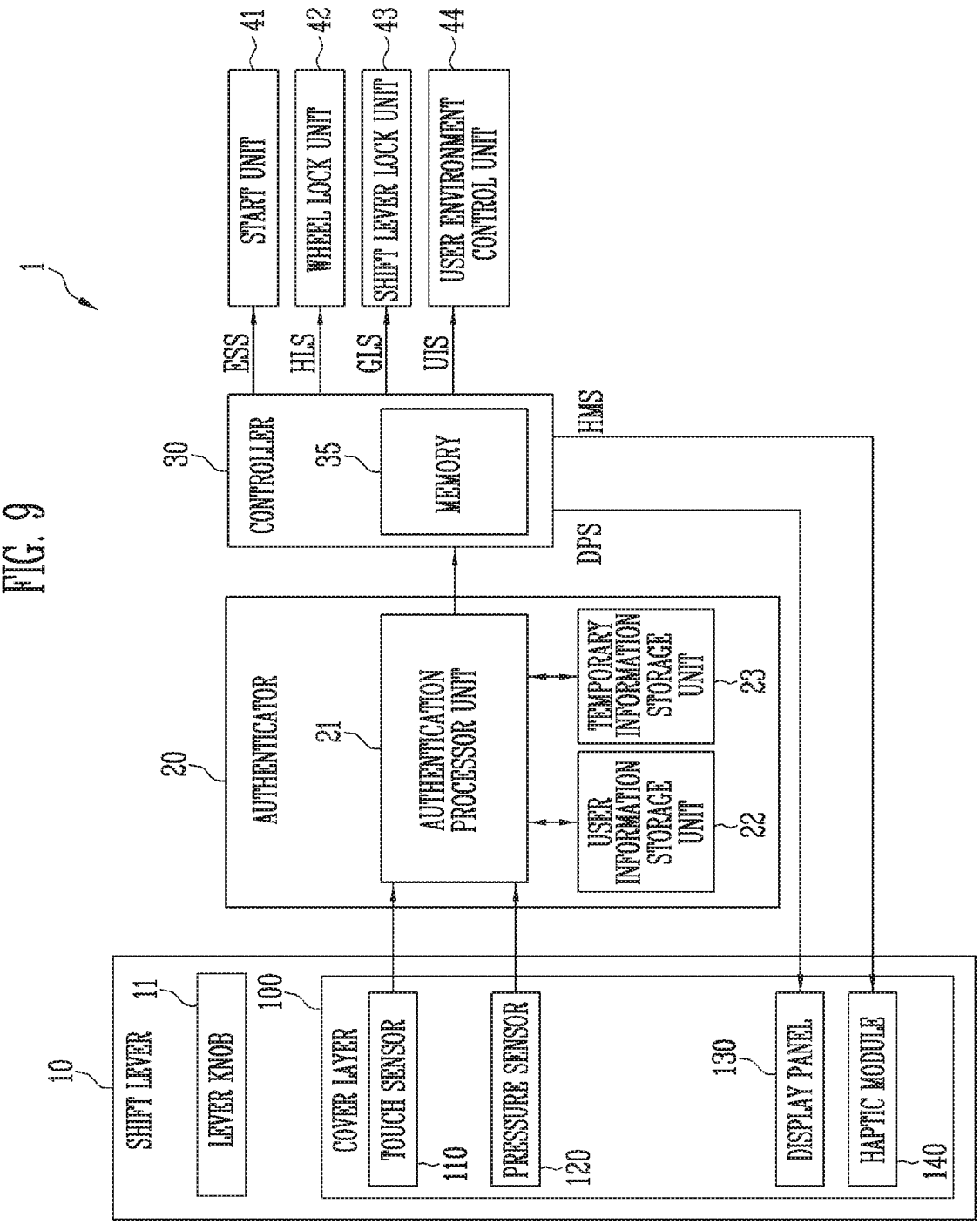

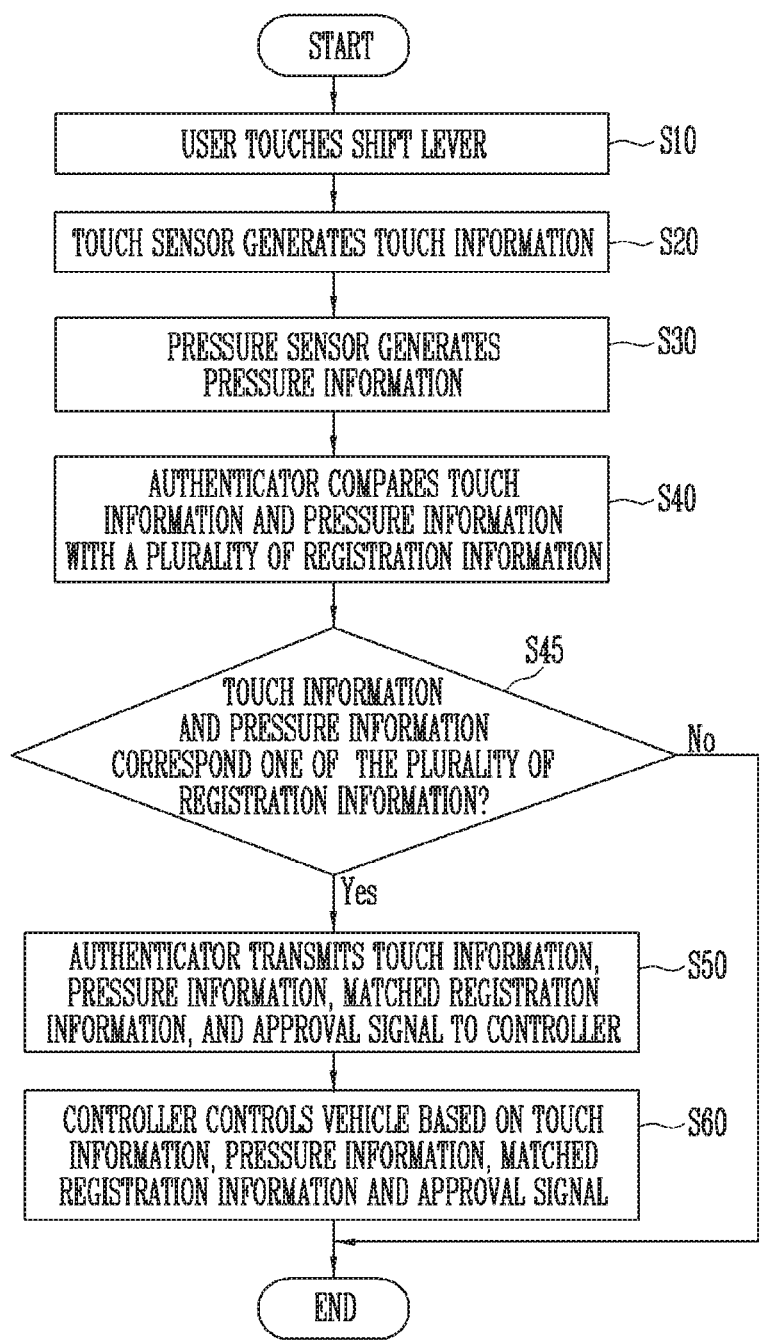

SHIFT LEVER AND VEHICLE CONTROL SYSTEM INCLUDING THE SAME

This application claims priority to Korean Patent Application No. 10-2016-0178035, filed on Dec. 23, 2016, and all the benefits accruing therefrom under 35 U.S.C. § 119, the content of which in its entirety is herein incorporated by reference.

BACKGROUND

1. Field

Exemplary embodiments of the disclosure relate to a shift lever and a vehicle control system including the shift lever.

2. Description of the Related Art

Conventionally, a key entry system using a remote controller or a security card has been used to prevent unauthorized access to a vehicle.

In a conventional remote controller type vehicle control system, a user may directly control locking of a door by operating a remote controller. In a conventional security card type vehicle control system, when the user having a security card approaches a vehicle, the door may be unlocked, and when the user enters the vehicle, the user may be authenticated by checking identification ("ID") of the security card.

SUMMARY

The conventional remote controller type vehicle control system and the conventional security card type vehicle control system may cause inconvenience to a user for carrying a remote controller or a security card. In addition, when the user loses the remote controller or the security card, the user may not have access to the vehicle.

Recently, a vehicle control system using a fingerprint recognition system including a function of identifying a user by recognizing a fingerprint of the user has been used to improve convenience and to prevent unauthorized access to a vehicle.

Embodiments of the disclosure are directed to a shift lever that performs authentication at the same time as when a user grips the shift lever and has improved security performance, and a vehicle control system including the shift lever.

According to an exemplary embodiment of the disclosure, a shift lever includes a lever knob, and a cover layer covering the lever knob, where the cover layer includes a touch sensor which generates touch information on a touch of a user, and the touch sensor includes a plurality of sensor pixels which senses a capacitance change corresponding to the touch.

In an exemplary embodiment, the touch information may include information on at least one of finger joint lines of the user, palm lines of the user, a fingerprint of the user, and a position of the touch.

In an exemplary embodiment, the touch sensor may further include a plurality of sensor scan lines connected to the plurality of sensor pixels and a plurality of output lines connected to the plurality of sensor pixels, where a sensor pixel of the plurality of sensor pixels may be connected to an i-th sensor scan line of the plurality of sensor scan lines and a j-th output line of the plurality of output lines, where i is an integer of 2 or greater, and j is a natural number, and.

In such an embodiment, the sensor pixel connected to the i-th sensor scan line scan lines and the j-th output line may include a sensor electrode, a first transistor including a gate electrode connected to the sensor electrode, where the first transistor controls a current output to the j-th output line, a second transistor connected between a reference voltage line and the first transistor, where a gate electrode of the second transistor is connected to the i-th sensor scan line, and a capacitor electrode which defines a first capacitor together with the sensor electrode and is connected to the i-th sensor scan line.

In an exemplary embodiment, the sensor pixel may further include a third transistor connected between the reference voltage line and the sensor electrode, where a gate electrode of the third transistor may be connected to an (i-1)-th scan line.

In an exemplary embodiment, the sensor electrode may define a second capacitor with a hand of the user when the touch of the user occurs, and the touch sensor may generate the touch information based on a capacitance change of the second capacitor corresponding to the touch.

In an exemplary embodiment, the cover layer may further include a pressure sensor which generates pressure information on a pressure change of the touch of the user.

In an exemplary embodiment, the cover layer may further include a display panel which displays an image based on the touch information and the pressure information.

In an exemplary embodiment, the cover layer may further include a haptic module which generates a haptic effect based on the touch information and the pressure information.

In an exemplary embodiment, the shift lever may further include a lever switch which controls a movement of the shift lever, and the cover layer may cover outer surfaces of the lever knob and the lever switch.

In an exemplary embodiment, the shift lever may further include a lever hub disposed under the lever knob, and a lever shaft connecting the lever knob and the lever hub to each other, where the cover layer has flexibility.

According to an exemplary embodiment of the disclosure, a vehicle control system includes a shift lever including a lever knob and a cover layer covering the lever knob, an authenticator which authenticates a user of a vehicle based on touch information and pressure information, and a controller which controls the vehicle based on the touch information, the pressure information, and an authentication result, where the cover layer includes a touch sensor which generates the touch information on a touch of the user, and a pressure sensor which generates the pressure information on a pressure change of the touch of the user, and the touch sensor includes a plurality of sensor pixels which senses a capacitance change corresponding to the touch.

In an exemplary embodiment, the touch information may include information on at least one of finger joint lines of the user, palm lines of the user, a fingerprint of the user, and a position of the touch.

In an exemplary embodiment, the vehicle control system may further include a lever switch which controls a movement of the shift lever, where the cover layer covers outer surfaces of the lever knob and the lever switch.

In an exemplary embodiment, the authenticator may include an authentication processor unit which compares the touch information and the pressure information with a plurality of registration information and transmits the touch information, the pressure information, matched registration information and an approval signal to the controller when the touch information and the pressure information are matched with one of the plurality of registration information, where the matched registration information is the one of the plurality of registration information matched with the touch information and the pressure information, a user information storage unit which stores the plurality of registration information, and a temporary information storage unit which stores the touch information and the pressure information.

In an exemplary embodiment, the controller may control the vehicle to start in response to the approval signal, and the controller may control a steering wheel and the shift lever to be unlocked in response to the approval signal.

In an exemplary embodiment, the controller may provide the user with user environment, which is set beforehand, based on the matched registration information in response to the approval signal, and the user environment may include at least one of a position of a wheel, directions of a rear view mirror and a side view mirror, a position and an angle of a driver's seat, an audio channel, and an air conditioner temperature.

In an exemplary embodiment, the cover layer may further include a display panel which displays an image in response to control of the controller.

In an exemplary embodiment, the controller may include a memory which stores the image, and the controller may control the display panel to display the image based on the touch information and the pressure information in response to the approval signal.

In an exemplary embodiment, the cover layer may further include a haptic module which vibrates according to a vibration pattern.

In an exemplary embodiment, the controller may include a memory which stores the vibration pattern, and the controller may controls the haptic module to be driven according to the vibration pattern based on the touch information and the pressure information in response to the approval signal.

BRIEF DESCRIPTION OF THE DRAWINGS

The above and other features of the invention will become more apparent by describing in further detail exemplary embodiments thereof with reference to the accompanying drawings, in which:

FIG. 4 is a partial cross-sectional diagram of a portion of the touch sensor shown in FIG. 3;

FIG. 5 is a plan diagram illustrating a sensor pixel according to an embodiment of the disclosure;

FIG. 9 is a diagram illustrating a vehicle control system according to an embodiment of the disclosure; and FIG. 10 is a flow chart showing an operation method of the vehicle control system according to an embodiment of the disclosure.

DETAILED DESCRIPTION

Figure 1A:
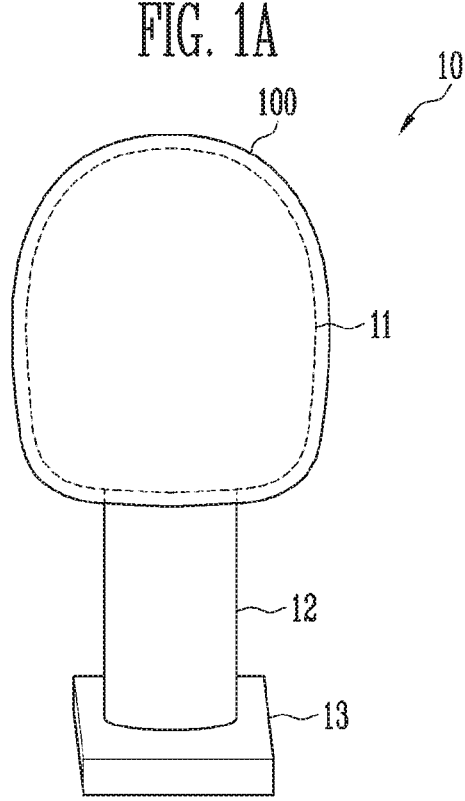
FIGS. 1A and 1B are diagrams illustrating a shift lever according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings so that those skilled in the art can easily carry out the disclosure. In order to clearly describe the disclosure in the drawings, parts irrelative to the description will be omitted.

Figure 1B:
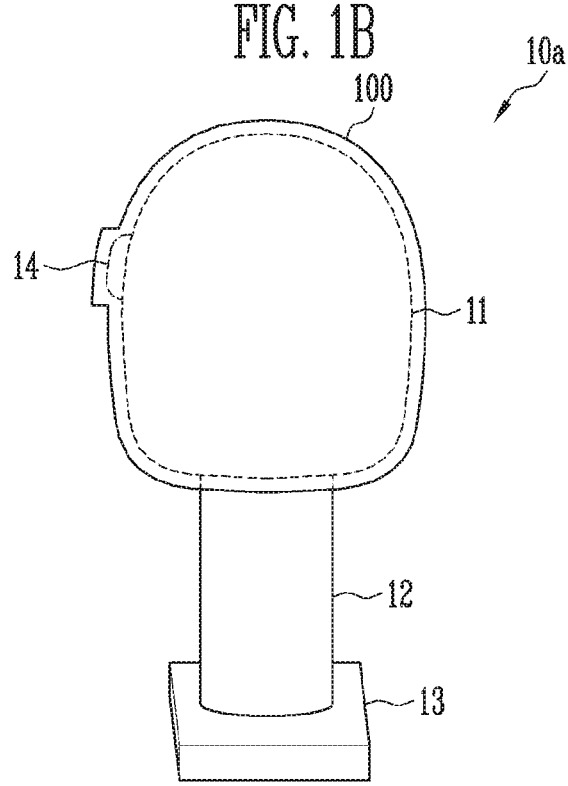
Figure 2A:
FIGS. 2A to 2C are diagrams illustrating the structure of a cover layer of the shift lever according to an embodiment of the disclosure.
Figure 2B:
Figure 2C:

FIGS. 1A and 1B are diagrams illustrating a shift lever according to an embodiment of the disclosure. FIGS. 2A to 2C are diagrams illustrating the structure of a cover layer of the shift lever according to an embodiment of the disclosure.

FIG. 1A shows a shift lever 10 according to an embodiment of the disclosure.

For convenience of illustration, in FIG. 1A, a lever knob 11 is indicated by a broken line.

In such an embodiment, the shift lever 10 may be a control device for shifting a gear of a vehicle.

Referring to FIG. 1A, the shift lever 10 may include the lever knob 11, a lever shaft 12, a lever hub 13, and a cover layer 100.

The lever knob 11 may refer to a handle to be gripped by a hand of a user.

The lever knob 11 may be gripped by the hand of the user. That is, the lever knob 11 may refer to a handle portion of the shift lever 10 to be gripped by the hand of the user.

The lever shaft 12 may transmit an external force generated in response to a movement of the hand of the user gripping the lever knob 11 to the lever hub 13.

According to an embodiment, the lever shaft 12 may be disposed between the lever knob 11 and the lever hub 13, and may connect the lever knob 11 and the lever hub 13 to each other.

According to an embodiment, the lever shaft 12 may have a cylindrical column shape. However, the disclosure is not limited thereto.

The lever hub 13 may be positioned under the lever shaft 12. The lever hub 13 may be connected to the lever knob 11 through the lever shaft 12.

The lever hub 13 may move in response to the external force transmitted from the lever shaft 12. A transmission of the vehicle may change a transmission ratio and a driving direction of the vehicle in accordance with the movement of the lever hub 13.

Herein, the term "transmission ratio" refers to a ratio between the numbers of input rotations and output rotations of a vehicle rotation shaft.

In one embodiment, for example, when the lever hub 13 is in P position, the vehicle may enter a park mode, and the transmission of the vehicle may change the transmission ratio to 0.

When the lever hub 13 is in N position, the vehicle may enter a neutral mode, and the transmission of the vehicle may change the transmission ratio to 0.

When the lever hub 13 is in R position, the vehicle may enter a reverse mode, and the transmission of the vehicle may change the transmission ratio according to a reverse transmission ratio set beforehand and change the driving direction of the vehicle to a reverse direction.

When the lever hub 13 is in D position, the vehicle may enter a drive mode, and the transmission of the vehicle may change the transmission ratio according to a drive transmission ratio set beforehand and change the driving direction of the vehicle to a forward direction.

According to an embodiment, the vehicle may include a plurality of drive modes, and the transmission of the vehicle may change the transmission ratio according to drive transmission ratios corresponding to the respective drive modes.

In such an embodiment, the shape of the lever knob 11 may be variously modified.

The cover layer 100 may cover an outer surface of the lever knob 11. Thus, the cover layer 100 may be directly in contact with the hand of the user. Herein, the term "cover" refers to covering a layer.

In an embodiment, as shown in FIG. 1A, the cover layer 100 may entirely cover the lever knob 11, but the disclosure is not limited thereto. Alternatively, the cover layer 100 may partially cover the lever knob 11.

The cover layer 100 may have flexibility. Herein, the term "flexibility" refers to the ability to be bent, that is, the quality to be deformed without breaking.

FIG. 1B shows a shift lever 10a according to an alternative embodiment of the disclosure. For convenience of illustration, the lever knob 11 and a lever switch 14 are indicated by broken lines in FIG. 1B.

In an embodiment, as shown in FIG. 1B, the shift lever 10a may further include the lever switch 14. The same or like elements shown in FIG. 1B have been labeled with the same reference characters as used above to describe the embodiments of the shift lever 10a shown in FIG. 1A, and any repetitive detailed description thereof will hereinafter be omitted or simplified.

Referring to FIG. 1B, the shift lever 10a may include the lever knob 11, the lever shaft 12, the lever hub 13, the lever switch 14, and the cover layer 100.

The lever switch 14 may control movement of the shift lever 10a. In one embodiment, for example, when the user presses the lever switch 14 with a finger, the shift lever 10a is allowed to move. However, the disclosure is not limited thereto.

The cover layer 100 may cover outer surfaces of the lever knob 11 and the lever switch 14.

In an embodiment, as shown in FIG. 1B, the cover layer 100 may entirely cover the lever knob 11 and the lever switch 14, but the disclosure is not limited thereto. Alternatively, the cover layer 100 may partially cover the lever knob 11 and the lever switch 14.

FIGS. 2A to 2C illustrate the structure of the cover layer 100 shown in FIGS. 1A and 1B.

In an embodiment, as shown in FIG. 2A, a cover layer 100a may include a touch sensor 110.

The touch sensor 110 may sense a touch of the user or a touch thereon by the user. In one embodiment, for example, the touch may be generated by a finger, a palm or the like, which is a part of the body of the user, and a sensing object of the touch sensor 110 may include at least one of a position of touch, finger joint lines of the user, palm lines of the user, and a fingerprint of the user.

The finger joint lines, the palm lines and the fingerprint of the user may include valleys and ridges.

The touch sensor 110 may generate touch information on the touch of the user. In one embodiment, for example, the touch information may include information on at least one of the finger joint lines, the palm lines, the fingerprint of the user and the position of the touch.

The touch sensor 110 will be described in greater detail alter with reference to FIGS. 3 to 8.

FIG. 2B shows a cover layer 100b according to an alternative embodiment of the disclosure.

The cover layer 100b in FIG. 2B is substantially the same as the cover layer 100a shown in FIG. 2A except for a pressure sensor 120. The same or like elements shown in FIG. 2B have been labeled with the same reference characters as used above to describe the embodiments of the cover layer 100a shown in FIG. 2A, and any repetitive detailed description thereof will hereinafter be omitted or simplified.

Referring to FIG. 2B, in an embodiment, the cover layer 100b may include the touch sensor 110 and the pressure sensor 120.

In an embodiment, as shown in FIG. 2B, the touch sensor 110 and the pressure sensor 120 are sequentially stacked one on the other, but the disclosure is not limited thereto. In such an embodiment, a stacking order in which the touch sensor 110 and the pressure sensor 120 are stacked may be variously modified.

In such an embodiment, the pressure sensor 120 may sense a pressure change by the touch of the user or change in pressure caused by the touch of the user. In one embodiment, for example, the pressure change may be caused by the finger, the palm or the like, which is the part of the body of the user, and the sensing object of the pressure sensor 120 may include at least one of the position of the touch and the pressure change by the touch.

The pressure sensor 120 may generate pressure information on the pressure change of the touch of the user.

In one embodiment, for example, the pressure information may include information on the position of the touch and distribution of a change in the pressure applied to the shift lever 10 by the user.

FIG. 2C shows a cover layer 100c according to another alternative embodiment of the disclosure.

The cover layer 100c shown in FIG. 2C is substantially the same as the cover layer 100b of FIG. 2B except for a display panel 130 and a haptic module 140. The same or like elements shown in FIG. 2C have been labeled with the same reference characters as used above to describe the embodiments of the cover layer 100b shown in FIG. 2B, and any repetitive detailed description thereof will hereinafter be omitted or simplified.

Referring to FIG. 2C, in an embodiment, the cover layer 100c may include the touch sensor 110, the pressure sensor 120, the display panel 130, and the haptic module 140.

In an embodiment, as shown in FIG. 2C, the touch sensor 110, the pressure sensor 120, the display panel 130, and the haptic module 140 are sequentially stacked one on another, but the disclosure is not limited thereto. According to an embodiment, a stacking order of the touch sensor 110, the pressure sensor 120, the display panel 130, and the haptic module 140 may be variously modified.

The display panel 130 may display an image corresponding to input image data. According to an embodiment, the display panel 130 may include a liquid crystal display panel ("LCD"), an organic light emitting display panel ("OLED"), an electrophoretic display panel, an electrowetting display panel or the like, but the types thereof are not limited.

The display panel 130 may have flexibility. In such an embodiment, the display panel 130 may be a flexible panel, such as a plastic panel and a thin metal panel, so that the display panel 130 may be bent by an external force.

According to an embodiment, the display panel 130 may display an image in response to control of a controller 30 (refer to FIG. 9).

According to an embodiment, the display panel 130 may display an image at an edge of a portion of the cover layer 100 in contact with the user, and the image may correspond to an operation state of the vehicle.

The haptic module 140 may generate various haptic effects that the user may feel. In one embodiment, for example, the haptic module 140 may generate a vibration may as the haptic effect.

The haptic module 140 may vibrate according to at least one of a plurality of vibration patterns. The haptic module 140 may provide vibration corresponding to at least one of the plurality of vibration patterns to the user.

According to an embodiment, the intensity and pattern of vibration generated in the haptic module 140 may be controlled by the controller 30 (refer to FIG. 9). In one embodiment, for example, the haptic module 140 may synthesize different vibration patterns to output a synthesized pattern or sequentially output the vibration patterns.

According to an embodiment, the haptic module 140 may provide vibration in area portion of the cover layer 100 that is in contact with the user.

The haptic module 140 may produce at least one of various haptic effects such as an effect by stimulation, for example, an arrangement of pins vertically moving with respect to a contact surface of the skin, a spraying force or a suction force of air through an injection port or an suction port, a touch on a skin surface, a contact of an electrode, an electrostatic force, etc., and an effect by reproducing cooling and warming effects using a device capable of absorbing or radiating heat, in addition to vibration.

The haptic module 140 may provide the haptic effect to the user through direct contact with the user and allow the user to feel the haptic effect through the muscle sense of the user's fingers or arms.

Figure 3:
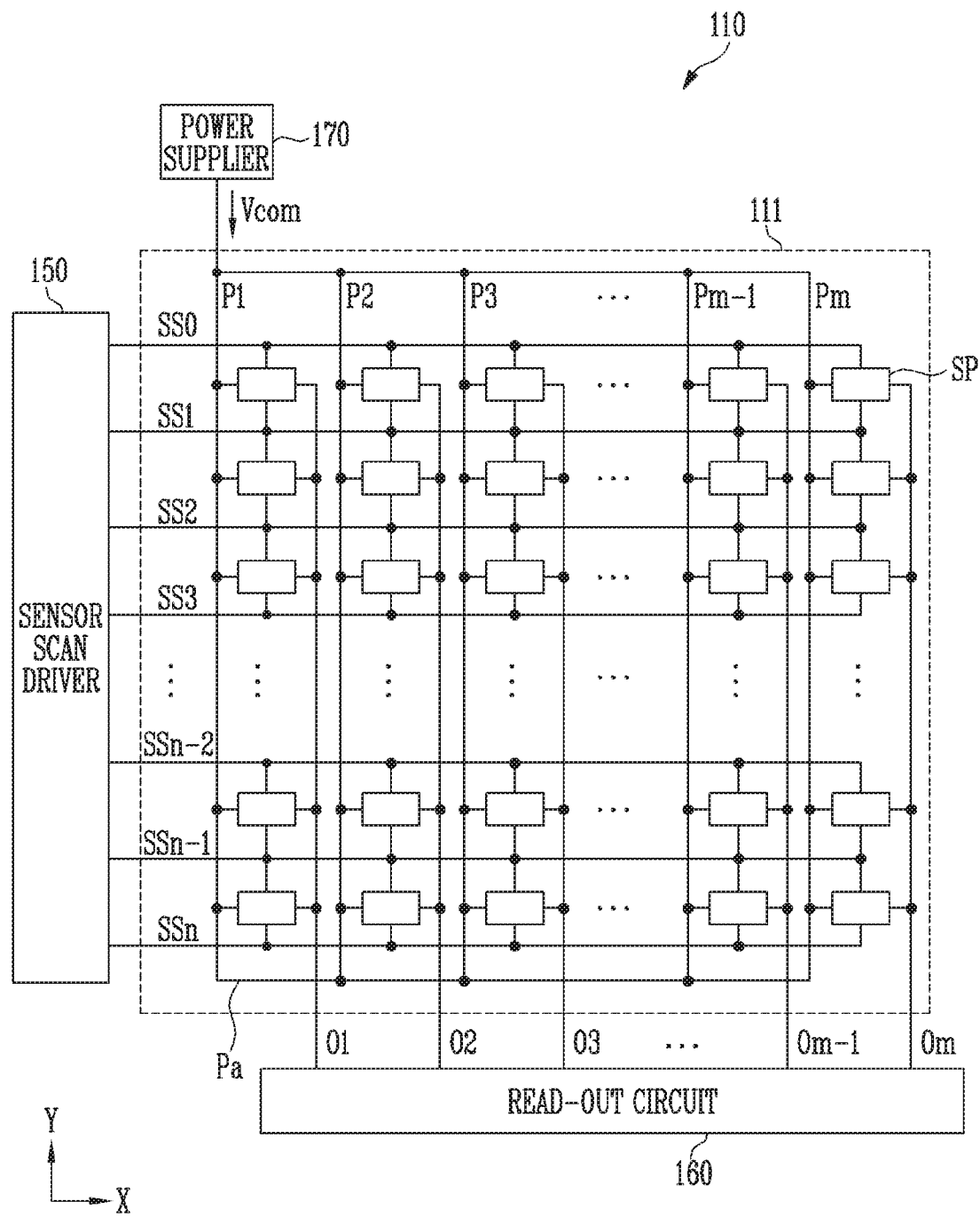
FIG. 3 is a diagram illustrating a touch sensor according to an embodiment of the disclosure.

FIG. 3 is a diagram illustrating a touch sensor according to an embodiment of the disclosure, and FIG. 4 is a partial cross-sectional diagram of a portion of the touch sensor shown in FIG. 3.

An embodiment of the touch sensor 110 may sense a touch of a user.

Referring to FIGS. 3 and 4, in an embodiment, the touch sensor 110 may include a substrate 111 and a plurality of sensor pixels SP.

The substrate 111 may include or be formed of an insulating material such as glass, resin, and the like. In an embodiment, the substrate 111 may include or be formed of a material having flexibility to be bent or folded, and may have a single-layer structure or a multi-layer structure.

In one embodiment, for example, the substrate 111 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, a material of the substrate 111 may not be limited those listed above. In an embodiment, the substrate 111 fiber glass reinforced plastic ("FRP"), for example.

In an embodiment, as shown in FIG. 4, the sensor pixels SP may be disposed on the substrate 111 substantially in a matrix form. In such an embodiment, the sensor pixels SP may be connected to sensor scan lines SS0 to SSn, and output lines O1 to Om.

The sensor pixels SP may receive sensor scan signals through the sensor scan lines SS0 to SSn, and the sensor pixels SP may output a predetermined current corresponding to a touch state to the output lines O1 to Om when the sensor scan signals are supplied.

The sensor scan lines SS0 to SSn may be disposed on the substrate 111, and each of the sensor scan lines SS0 to SSn extends in a first direction (e.g., an X-axis direction) to be connected to the sensor pixels SP in a corresponding pixel row.

The output lines O1 to Om may be disposed on the substrate 111, and each of the output lines O1 to Om extends in a second direction (e.g., a Y-axis direction) to be connected to the sensor pixels SP in a corresponding pixel column.

In an embodiment, the sensor pixels SP may be connected to reference voltage lines P1 to Pm, and receive a reference voltage Vcom therethrough.

Each of the reference voltage lines P1 to Pm may extend in the second direction (e.g., the Y-axis direction) and be connected to the sensor pixels SP on the line basis.

In one embodiment, for example, the reference voltage lines P1 to Pm may be arranged in parallel with the output lines O1 to Om.

However, the arrangement directions of the reference voltage lines P1 to Pm may be variously modified. In one alternative embodiment, for example, the reference voltage lines P1 to Pm may be arranged in parallel with the sensor scan lines SS0 to SSn.

The reference voltage lines P1 to Pm may be electrically connected to one another to maintain the same potential as each other.

In one embodiment, for example, the reference voltage lines P1 to Pm may be electrically connected to one another through an additional wire Pa at an outer portion of the substrate 111.

In an embodiment, the touch sensor 110 may further include a sensor scan driver 150 for driving the touch sensor 110, a read-out circuit 160, and a power source supplier 170.

The sensor scan driver 150 may supply sensor scan signals to the sensor pixels SP through the sensor scan lines SS0 to SSn.

In one embodiment, for example, the sensor scan driver 150 may sequentially output the sensor scan signals to the sensor scan lines SS0 to SSn.

In an embodiment, each of the sensor pixels SP may include transistor, and a sensor scan signal is applied thereto. In such an embodiment, the sensor scan signal may have a voltage level at which the transistor is turned on is turned on.

In an embodiment, the sensor scan driver 150 may be directly mounted on the substrate 111 or be connected to the substrate 111 through an additional component such as a flexible printed circuit board, etc., to be connected with the sensor scan lines SS0 to SSn.

The read-out circuit 160 may receive a signal (e.g., a current) output from the sensor pixels SP through the output lines O1 to Om.

In one embodiment, for example, when the sensor scan driver 150 sequentially supplies the sensor scan signals, the sensor pixels SP may be selected, e.g., turned-on, on a line-by-line basis, and the read-out circuit 160 may sequentially receive currents output from the sensor pixels SP on the line-by-line basis.

The read-out circuit 160 may recognize current touch information by sensing variation in the current output from the sensor pixels SP.

In one embodiment, for example, touch information may include information on at least one of the finger joint lines, the palm lines, and the fingerprint of the user and the position of the touch.

In an embodiment, the read-out circuit 160 may be directly mounted on the substrate 111 or be connected to the substrate 111 through the additional component such as the flexible circuit board, etc., to be connected with the output lines O1 to Om.

The power source supplier 170 may supply the reference voltage Vcom to the sensor pixels SP through the reference voltage lines P1 to Pm.

In an embodiment, the power source supplier 170 may be directly mounted on the substrate 111 or connected to the substrate 111 through an additional component such as a flexible circuit board, etc., to be connected with the reference voltage lines P1 to Pm.

Although the sensor scan driver 150, the read-out circuit 160, and the power source supplier 170 are separately shown in FIG. 3, at least some of the constituents may be integrated as desired.

In an embodiment, the sensor scan driver 150, the read-out circuit 160, and the power source supplier 170 may be mounted by various methods such as a chip-on-glass, a chip-on-plastic, a tape carrier package, a chip-on-film, and the like.

FIG. 5 is a plan diagram illustrating a sensor pixel according to an embodiment of the disclosure. In FIG. 5, for convenience of illustration and description, only one sensor pixel connected to an i-th sensor scan line SSi and a j-th output line Oj is shown among the sensor pixels SP. Here, i is an integer of 2 or more, and j is a natural number.

Referring to FIG. 5, in an embodiment, the sensor pixel SP may include a sensor electrode 300, a first transistor T1, a second transistor T2, a third transistor T3, and a capacitor electrode 350.

The first transistor T1 may control a current flowing through the j-th output line Oj. The first transistor T1 may be connected between the j-th output line Oj and the second transistor T2.

In one embodiment, for example, the first transistor T1 may include a first electrode 312 connected to a second electrode 323 of the second transistor T2, a second electrode 313 connected to the j-th output line Oj, a gate electrode 314 connected to the sensor electrode 300, and a semiconductor layer 311 connected between the first electrode 312 and the second electrode 313.

In such an embodiment, the gate electrode 314, the first electrode 312, and the second electrode 313 of the first transistor T1 may be connected to other constituents through first to third contact holes CH1, CH2 and CH3, respectively.

Therefore, the first transistor T1 may control an output current Io output to the j-th output line Oj corresponding to a potential of the sensor electrode 300.

The second transistor T2 may be connected between a j-th reference voltage line Pj and the first transistor T1.

In one embodiment, for example, the second transistor T2 may include a first electrode 322 connected to the j-th reference voltage line Pj, a second electrode 323 connected to the first electrode 312 of the first transistor T1, a gate electrode 324 connected to the i-th sensor scan line SSi, and a semiconductor layer 321 connected between the first electrode 322 and the second electrode 323.

In addition, the first electrode 322 and the second electrode 323 of the second transistor T2 may be connected to other constituents through fourth and fifth contact holes CH4 and CH5, respectively.

Therefore, the second transistor T2 may be turned on when a sensor scan signal is supplied to the i-th sensor scan line SSi. When the second transistor T2 is turned on, the reference voltage Vcom may be applied to the first electrode 312 of the first transistor T1.

The third transistor T3 may be connected between the j-th reference voltage line Pj and the sensor electrode 300.

In one embodiment, for example, the third transistor T3 may include a first electrode 332 connected to the j-th reference voltage line Pj, a second electrode 333 connected to the sensor electrode 300, a gate electrode 334 connected to an (i-1)-th sensor scan line SSi-1, and a semiconductor layer 331 connected between the first electrode 332 and the second electrode 333.

In addition, the first electrode 332 and the second electrode 333 of the third transistor T3 may be connected to other constituents through sixth and seventh contact holes CH6 and CH7, respectively.

Therefore, the third transistor T3 may be turned on when a sensor scan signal is supplied to the (i-1)-th sensor scan line SSi-1. When the third transistor T3 is turned on, a voltage of the sensor electrode 300 may be initialized to the reference voltage Vcom.

The capacitor electrode 350 may be disposed to overlap with the sensor electrode 300, such that a capacitor is defined or formed by the capacitor electrode 350 together with the sensor electrode 300.

In an embodiment, the capacitor electrode 350 may be connected to the i-th sensor scan line SSi. In one embodiment, for example, the capacitor electrode 350 may be connected to the i-th sensor scan line SSi through the gate electrode 324 of the second transistor T2.

The capacitor electrode 350 and the gate electrode 324 of the second transistor T2 may include or be formed of the same material as the i-th sensor scan line SSi.

The sensor electrode 300 may defined or form a capacitor together with the capacitor electrode 350, a finger of the user, etc.

In an embodiment, the sensor electrode 300 may include a conductive material. In such an, the conductive material may include a metal, an alloy thereof, a conductive polymer, a transparent conductive material or the like, for example.

In such an embodiment, the metals may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead or the like, for example.

In such an embodiment, the conductive polymer may include a polythiophene-based compound, a polypyrrole-based compound, a polyaniline-based compound, a polyacetylene-based compound, polyphenylene-based compounds, or a mixture thereof, for example. In one embodiment, for example, a poly(3,4-ethylenedioxythiophene) polystyrene sulfonate ("PEDOT:PSS") compounds may be used as the conductive polymer.

In such an embodiment, the transparent conductive material may include a silver nanowire ("AgNW"), indium tin oxide ("ITO"), indium zinc oxide ("IZO"), antimony zinc oxide ("AZO"), indium tin zinc oxide ("ITZO"), zinc oxide (ZnO), and tin oxide (SnO2), carbon nano-tubes, graphene or the like, for example.

Figure 6:
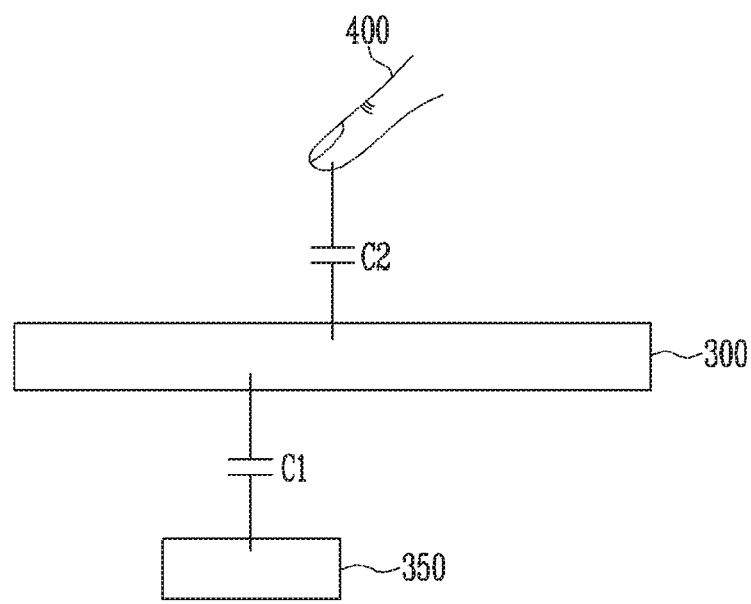
FIG. 6 is a cross-sectional diagram illustrating the sensor pixel according to an embodiment of the disclosure.

FIG. 6 is a cross-sectional diagram illustrating the sensor pixel according to an embodiment of the disclosure. Specifically, FIG. 6 schematically shows a cross-section of the sensor pixel SP of FIG. 5 when a finger 400 is located on the sensor pixel SP.

Referring to FIGS. 3 to 6, a sensor protection layer (not shown) may be disposed on the sensor electrode 300, and the sensor protection layer (not shown) may be used as a surface on which the touch of the user occurs.

The sensor electrode 300 and the capacitor electrode 350 may form a first capacitor C1. The sensor electrode 300 and the capacitor electrode 350 may be spaced apart from each other with an insulating layer (not shown) interposed therebetween.

The sensor electrode 300 and the finger 400 of the user may define or form a second capacitor C2. A capacitance of the second capacitor C2 may vary depending on a distance between the sensor electrode 300 and the finger 400.

Thus, a capacitance of the second capacitor C2 in a state where a touch is generated by the finger 400 and a capacitance of the second capacitor C2 in a state where no touch is generated may be different from each other.

In such an embodiment, a capacitance of the second capacitor C2 when the ridges of the finger 400 (e.g., the fingerprint thereof) are located on the sensor electrode 300 and a capacitance of the second capacitor C2 when the valleys of the finger 400 are located on the sensor electrode 300 may be different from each other.

Since the change in the capacitance of the second capacitor C2 affects the output current Io of the sensor pixel SP, the read-out circuit 160 may determine whether a touch is generated and recognize the fingerprint of the user by detecting the variation in the output current Io.

In such an embodiment, the read-out circuit 160 may recognize the finger joint lines and the palm lines of the user using the above-described manner.

Figure 7:
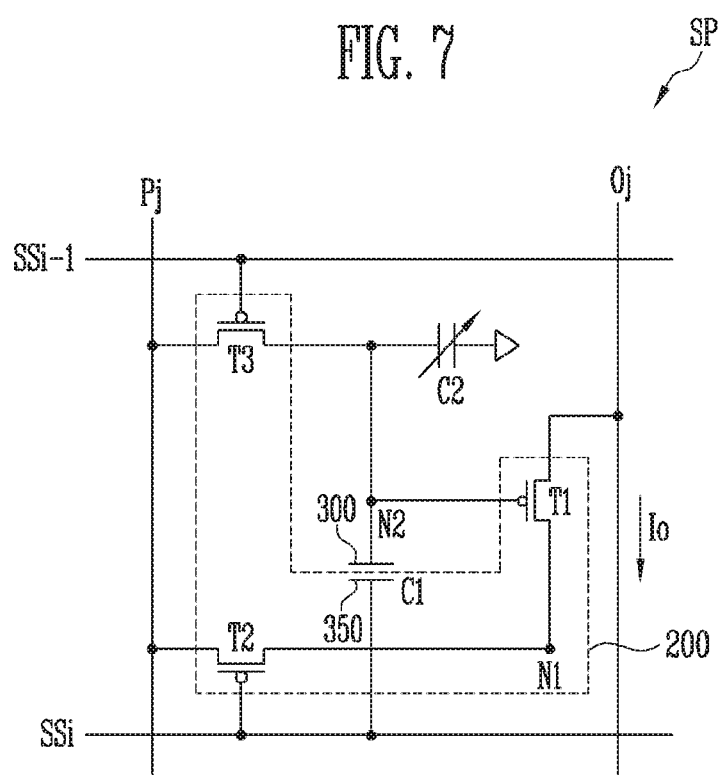
FIG. 7 is an equivalent circuit diagram of an embodiment of the sensor pixel shown in FIG. 5.
Figure 8:
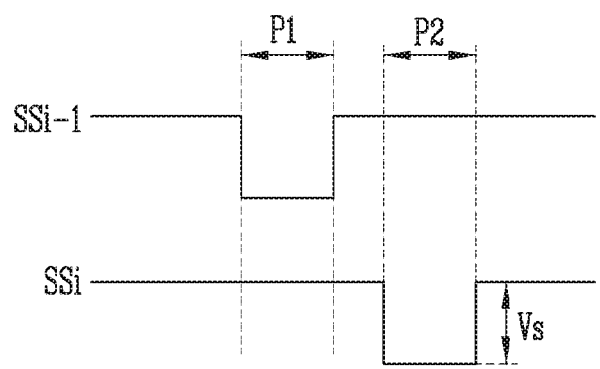
FIG. 8 is a waveform diagram illustrating an operation of the sensor pixel shown in FIG. 7.

FIG. 7 is an equivalent circuit diagram of an embodiment of the sensor pixel shown in FIG. 5, and FIG. 8 is a waveform diagram illustrating an operation of a sensor pixel shown in FIG. 7.

For convenience of illustration, among the sensor pixels SP, only the sensor pixel SP connected to the i-th sensor scan line SSi, the (i-1)-th sensor scan line SSi-1, and the j-th output line Oj is shown in FIG. 7. In addition, in FIG. 8, a sensor scan signal supplied to the (i-1)-th sensor scan line SSi-1 and a sensor scan signal supplied to the i-th sensor scan line SSi are shown.

Referring to FIG. 7, the sensor pixel SP may include the sensor electrode 300, the capacitor electrode 350, the first transistor T1, the second transistor T2, and the third transistor T3.

In such an embodiment, as described above, the sensor electrode 300 and the capacitor electrode 350 may constitute the first capacitor C1, and the capacitor electrode 350, the first transistor T1, the second transistor T2, and the third transistor T3 may constitute a sensor circuit 200.

In such an embodiment, the second capacitor C2 may be a variable capacitor and defined by the sensor electrode 300 and the finger 400 as described above. A capacitance of the second capacitor C2 may vary depending on the distance between the sensor electrode 300 and the finger 400, whether the valleys or the ridges of the fingerprint are located on the sensor electrode 300, and an intensity of a pressure caused by the touch.

The first transistor T1 may control the current flowing through the j-th output line Oj. The first transistor T1 may be connected between the j-th output line Oj and the second transistor T2.

In such an embodiment, the first transistor T1 may be connected between the j-th output line Oj and a first node N1, and a gate electrode thereof may be connected to a second node N2.

In one embodiment, for example, the first transistor T1 may include a first electrode connected to a second electrode of the second transistor T2, a second electrode connected to the j-th output line Oj, and the gate electrode connected to the sensor electrode 300.

The second transistor T2 may be connected between the j-th reference voltage line Pj and the first transistor T1.

In such an embodiment, the second transistor T2 may be connected between the j-th reference voltage line Pj and the first node N1, and a gate electrode thereof may be connected to the i-th sensor scan line SSi.

In one embodiment, for example, the second transistor T2 may include a first electrode connected to the j-th reference voltage line Pj, the second electrode connected to the first electrode of the first transistor T1, and the gate electrode connected to the i-th sensor scan line SSi.

Accordingly, the second transistor T2 may be turned on when the sensor scan signal is supplied to the i-th sensor scan line SSi. When the second transistor T2 is turned on, the reference voltage Vcom may be applied to the first electrode of the first transistor T1.

The third transistor T3 may be connected between the j-th reference voltage line Pj and the sensor electrode 300.

In such an embodiment, the third transistor T3 may be connected between the second node N2 and the j-th reference voltage line Pj, and a gate electrode thereof may be connected to the (i-1)-th sensor scan line SSi-1.

In one embodiment, for example, the third transistor T3 may include the first electrode connected to the j-th reference voltage line Pj, a second electrode connected to the sensor electrode 300, and the gate electrode connected to the (i-1)-th sensor scan line SSi-1.

Therefore, the third transistor T3 may be turned on when the sensor scan signal is supplied to the (i-1)-th sensor scan line SSi-1. When the third transistor T3 is turned on, the voltage of the sensor electrode 300 may be initialized to the reference voltage Vcom.

The capacitor electrode 350 may be disposed to overlap with the sensor electrode 300, such that the first capacitor C1 may be defined or formed by the capacitor electrode 350 together with the sensor electrode 300.

In such an embodiment, the capacitor electrode 350 may be connected to the i-th sensor scan line SSi.

Accordingly, the first capacitor C1 may be connected between the second node N2 and the i-th sensor scan line SSi.

In such an embodiment, the second capacitor C2 may be connected to the second node N2.

The first electrode of the first transistor T1 and the second electrode of the second transistor T2 may be commonly connected to the first node N1, and the sensor electrode 300, the gate electrode of the first transistor T1, and the second electrode of the third transistor T3 may be commonly connected to the second node N2.

The first electrodes of each of the first to third transistors T1, T2 and T3 may be one of a source electrode and a drain electrode, and the second electrodes of each of the first to third transistors T1, T2 and T3 may be the other of the source electrode and the drain electrode. In one embodiment, for example, a first electrode may be the source electrode, and a second electrode may the drain electrode.

In an embodiment, the first to third transistors T1, T2 and T3 may be P-type metal-oxide-semiconductor ("PMOS") transistors. However, in an alternative embodiment, the first to third transistors T1, T2 and T3 may be N-type metal-oxide-semiconductor ("NMOS") transistors.

FIG. 8 is a waveform diagram illustrating an operation of the sensor pixel shown in FIG. 7. Referring to FIG. 8, a sensor scan signal may be supplied to the (i-1)-th sensor scan line SSi-1 during a first period P1.

When the sensor scan signal may be supplied to the (i-1)-th sensor scan line SSi-1 in the first period P1, the third transistor T3 may maintain a turn-on state during the first period P1, and the second node N2 may be initialized to the reference voltage Vcom applied from the j-th reference voltage line Pj during the first period P1.

As shown in FIG. 8, the sensor scan signal may be supplied to the i-th sensor scan line SSi during a second period P2.

When the sensor scan signal is supplied to the i-th sensor scan line SSi in the second period P2, the second transistor T2 may maintain the turn-on state during the second period P2, and the output current Io may flow from the j-th reference voltage line Pj to the j-th output line Oj through the second transistor T2 and the first transistor T1 during the second period P2.

The first transistor T1 may control the amount of the output current Io corresponding to a gate voltage (a voltage of the second node N2).

In one embodiment, for example, the output current Io may be changed according to a gate voltage Vg of the first transistor T1, and the gate voltage Vg of the first transistor T1 may satisfy the following equation: $Vg=Vcom+\{Vc1/(Vc1+Vc2)\} \times Vs$.

In the above equation, Vcom denotes a reference voltage, Vc1 denotes a capacitance of the first capacitor C1, Vc2 denotes a capacitance of the second capacitor C2, and Vs denotes the voltage variation in the sensor scan signal supplied to the i-th sensor scan line SSi.

FIG. 9 is a diagram illustrating a vehicle control system according to an embodiment of the disclosure. Referring to FIG. 9, an embodiment of a vehicle control system 1 may include the shift lever 10, an authenticator 20, and the controller 30.

The shift lever 10 may include the lever knob 11 and the cover layer 100.

The cover layer 100 may include the touch sensor 110, the pressure sensor 120, the display panel 130, and the haptic module 140.

The touch sensor 110 may sense a touch of the user and generate touch information on the touch. In such an embodiment, the touch sensor 110 may transmit the generated touch information to the authenticator 20.

The pressure sensor 120 may sense a pressure change of the touch of the user and generate pressure information on the pressure change. In such an embodiment, the pressure sensor 120 may transmit the generated pressure information to the authenticator 20.

The display panel 130 may display an image according to a display panel control signal DPS received from the controller 30. In one embodiment, for example, the display panel control signal DPS may include image data for at least one of a plurality of images.

The haptic module 140 may produce various haptic effects that the user may feel according to a haptic module control signal HMS received from the controller 30. In such an embodiment, the haptic module 140 may vibrate according to the plurality of vibration patterns. In one embodiment, for example, the haptic module control signal HMS may include vibration data for at least one of the plurality of vibration patterns.

The authenticator 20 may authenticate the user of the vehicle based on the touch information and the pressure information.

According to an embodiment, the authenticator 20 may include an authentication processor unit 21, a user information storage unit 22, and a temporary information storage unit 23.

The authentication processor unit 21 may receive the touch information and the pressure information, and store the touch information and the pressure information in the temporary information storage unit 23.

The authentication processor unit 21 may compare the touch information and the pressure information with a plurality of registration information stored in the user information storage unit 22. In one embodiment, for example, the authentication processor unit 21 may check whether the touch information and the pressure information are matched with any one of the plurality of registration information.

When the touch information and the pressure information are matched with any one of the plurality of registration information, the authentication processor unit 21 may transmit the touch information, the pressure information, the matched registration information and an approval signal to the controller 30. Accordingly, in such an embodiment, the authentication processor unit 21 may authenticate a user and transmit the touch information, the pressure information, the matched registration information and the approval signal to the controller 30 when the user is a registered user.

Each of the registration information may include touch information and/or pressure information of each user.

In an embodiment, each of the registration information may further include user environment information of a corresponding user. In one embodiment, for example, the user environment information may include information on at least one of a position of a wheel set beforehand for the corresponding user, directions of a rear view mirror and a side view mirror, a position and an angle of a driver's seat, an audio channel, and an air conditioner temperature.

The user information storage unit 22 may store the plurality of registration information and provide the plurality of registration information to the authentication processor unit 21 under the control of the authentication processor unit 21.

The temporary information storage unit 23 may store the touch information and the pressure information and provide the touch information and the pressure information to the authentication processor unit 21 under the control of the authentication processor unit 21.

In an embodiment, the user information storage unit 22 and the temporary information storage unit 23 may be integrated into a single unit and may be included in the authentication processor unit 21.

The controller 30 may receive the touch information, the pressure information, the matched registration information, and the approval signal from the authenticator 20.

The controller 30 may control the overall operation of the vehicle based on the touch information, the pressure information, the matched registration information, and the approval signal.

In one embodiment, for example, the controller 30 may start the vehicle by transmitting a start approval signal ESS to a start unit 41 in response to the approval signal. In such an embodiment, the controller 30 may release a locked state of the steering wheel by transmitting a wheel release signal HLS to a wheel lock unit 42 in response to the approval signal. In such an embodiment, the controller 30 may release a locked state of the shift lever 10 by transmitting a shift lever lock release signal GLS to a shift lever lock unit 43 in response to the approval signal.

Therefore, the controller 30 may control starting, locking of the steering wheel, and locking of the shift lever based on the touch information and the pressure information of the user, so that the shift lever 10 or the vehicle control system 1 including the shift lever 10 may have improved security performance.

In one embodiment, for example, in response to the approval signal, the approval signal, the controller 30 may transmit a user environment set signal UIS to a user environment control unit 44 based on the matched registration information to provide the user with user environment set beforehand.

In such an embodiment, the controller 30 may control at least one of the position of the wheel set beforehand for each user, the directions of the rear view mirror and the side view mirror, the position and the angle of the driver's seat, the audio channel, and the air conditioner temperature based on user environment information set beforehand for each user.

According to an embodiment, the user environment information set beforehand for each user may be included in each of the plurality of registration information, but the disclosure is not limited thereto. The user environment information set beforehand for each user may be stored in a memory 35 of the controller 30.

Therefore, in such an embodiment, the controller 30 may provide the user with user environment set beforehand based on the touch information and the pressure information of the user, so that the shift lever 10 or the vehicle control system 1 including the shift lever 10 may provide optimal user environment for each user.

In one embodiment, for example, in response to the approval signal, the controller 30 may transmit the display panel control signal DPS to the display panel 130 based on the touch signal and the pressure signal to control the display panel 130 to display at least one of the plurality of images.

In one embodiment, for example, in response to the approval signal, the controller 30 may transmit the haptic module control signal HMS to the haptic module 140 based on the touch signal and the pressure signal to control the haptic module 140 to vibrate according to at least one of the plurality of vibration patterns.

The controller 30 may include the memory 35.

The memory 35 may include the plurality of images and the plurality of vibration patterns.

According to an embodiment, the memory 35 may store the user environment information set beforehand for each user. However, the disclosure is not limited thereto.

FIG. 10 is a flow chart showing an operation method of a vehicle control system according to an embodiment of the disclosure.

Referring to FIGS. 1A to 10, in an embodiment of an operation method of a vehicle control system, the user may touch the shift lever 10 with a user's hand (S10).

In such an embodiment, the touch sensor 110 may generate touch information (S20).

In such an embodiment, the pressure sensor 120 may generate pressure information (S30).

In such an embodiment, the authenticator 20 may compare the touch information and the pressure information with a plurality of registration information (S40).

In such an embodiment, it is determined whether the touch information and the pressure information correspond to or are matched with one of the plurality of registration information (S45). When the touch information and the pressure information are matched with one of the plurality of registration information (YES), the authenticator 20 may transmit the touch information, the pressure information, the matched registration information and an approval signal to the controller 30 (S50).

In such an embodiment, the controller 30 may control the vehicle based on the touch information, the pressure information, the matched registration information, and the approval signal (S60).

According to an embodiment of the invention, a shift lever or a vehicle control system including the shift lever may perform authentication at the same time when a user grips the shift lever.

In such an embodiment, a shift lever or a vehicle control system including the shift lever may have improved security performance.

In such an embodiment, a shift lever or a vehicle control system including the shift lever may provide optimal user environment for each user.

It will be apparent to those skilled in the art that the disclosure may be embodied in other specific forms without departing from the spirit or essential characteristics thereof. It is therefore to be understood that the above-described embodiments are illustrative in all aspects and not restrictive. The scope of the disclosure is defined by the appended claims rather than by the foregoing description, and all changes or modifications derived from the meaning and scope of the claims and the equivalents thereof are included in the scope of the disclosure Should be interpreted.

What is claimed is:

1. A shift lever, comprising:
a lever knob; and
a cover layer covering the lever knob and having flexibility,
wherein the cover layer comprises a touch sensor which generates touch information on a touch of a user and a pressure sensor which senses a pressure change by the touch of the user, and
the touch sensor comprises a plurality of sensor pixels which senses a capacitance change corresponding to the touch.

2. The shift lever of claim 1, wherein the touch information includes information on at least one of finger joint lines of the user, palm lines of the user, a fingerprint of the user, and a position of the touch.

3. The shift lever of claim 1, wherein the touch sensor further comprises:
a plurality of sensor scan lines connected to the plurality of sensor pixels; and
a plurality of output lines connected to the plurality of sensor pixels,
a sensor pixel of the plurality of sensor pixels is connected to an i-th sensor scan line of the plurality of sensor scan lines and a j-th output line of the plurality of output lines, wherein i is an integer of 2 or greater, and j is a natural number, and
the sensor pixel connected to the i-th sensor scan line scan lines and the j-th output line comprises:
a sensor electrode;
a first transistor including a gate electrode connected to the sensor electrode, wherein the first transistor controls a current output to the j-th output line;
a second transistor connected between a reference voltage line and the first transistor, wherein a gate electrode of the second transistor is connected to the i-th sensor scan line; and a capacitor electrode which defines a first capacitor together with the sensor electrode and is connected to the i-th sensor scan line.

4. The shift lever of claim 3, wherein
the sensor pixel further comprises a third transistor connected between the reference voltage line and the sensor electrode,
wherein a gate electrode of the third transistor is connected to an (i-1)-th scan line of the plurality of sensor scan lines.

5. The shift lever of claim 4, wherein
the sensor electrode defines a second capacitor with a hand of the user when the touch of the user occurs, and
the touch sensor generates the touch information based on a capacitance change of the second capacitor corresponding to the touch.

6. The shift lever of claim 1, wherein the cover layer further comprises a display panel which displays an image based on the touch information and the pressure information.

7. The shift lever of claim 1, wherein the cover layer further comprises a haptic module which generates a haptic effect based on the touch information and the pressure information.

8. The shift lever of claim 1, further comprising:
a lever switch which controls a movement of the shift lever, and
the cover layer covers outer surfaces of the lever knob and the lever switch.

9. The shift lever of claim 8, further comprising:
a lever hub disposed under the lever knob; and
a lever shaft connecting the lever knob and the lever hub to each other.

10. A vehicle control system, comprising:
a shift lever comprising a lever knob and a cover layer covering the lever knob;
an authenticator which authenticates a user of a vehicle based on touch information and pressure information; and
a controller which controls the vehicle based on the touch information, the pressure information and an authentication result,
wherein the cover layer comprises:
a touch sensor which generates the touch information on a touch of the user; and
a pressure sensor which senses a pressure change of the touch of the user,
wherein the touch sensor comprises a plurality of sensor pixels which senses a capacitance change corresponding to the touch, and
wherein the cover layer has flexibility.

11. The vehicle control system of claim 10, wherein the touch information includes information on at least one of finger joint lines of the user, palm lines of the user, a fingerprint of the user, and a position of the touch.

12. The vehicle control system of claim 10, further comprising:
a lever switch which controls a movement of the shift lever,
wherein the cover layer covers outer surfaces of the lever knob and the lever switch.

13. The vehicle control system of claim 10, wherein the authenticator comprises:
an authentication processor unit which compares the touch information and the pressure information with a plurality of registration information and transmits the touch information, the pressure information, matched registration information, and an approval signal to the controller when the touch information and the pressure information are matched with one of the plurality of registration information, wherein the matched registration information is the one of the plurality of registration information matched with the touch information and the pressure information;

a user information storage unit which stores the plurality of registration information; and a temporary information storage unit which stores the touch information and the pressure information.

14. The vehicle control system of claim 13, wherein
the controller controls the vehicle to start in response to the approval signal, and
the controller controls a steering wheel and the shift lever to be unlocked in response to the approval signal.

15. The vehicle control system of claim 13, wherein
the controller provides the user with user environment, which is set beforehand, based on the matched registration information in response to the approval signal, and
the user environment includes at least one of a position of a wheel, directions of a rear view mirror and a side view mirror, a position and an angle of a driver's seat, an audio channel, and an air conditioner temperature.

16. The vehicle control system of claim 13, wherein the cover layer further comprises a display panel which displays an image in response to control of the controller.

17. The vehicle control system of claim 16, wherein
the controller comprises a memory which stores the image, and
the controller controls the display panel to display the image based on the touch information and the pressure information in response to the approval signal.

18. The vehicle control system of claim 13, wherein the cover layer further comprises a haptic module which vibrates according to a vibration pattern.

19. The vehicle control system of claim 18, wherein
the controller comprises a memory which stores the vibration pattern, and
the controller controls the haptic module to be driven according to the vibration pattern based on the touch information and the pressure information in response to the approval signal.

* * * * *